United States Patent [19]

Wisner

[11] Patent Number: 4,814,803
[45] Date of Patent: Mar. 21, 1989

[54] MID-LINE TILT MECHANISM FOR VIEW CAMERA

[76] Inventor: Ronald B. J. Wisner, P.O. Box 21, Marion, Mass. 02738

[21] Appl. No.: 83,656

[22] Filed: Aug. 7, 1987

[51] Int. Cl.⁴ ............................ G03B 5/06; G03B 5/08
[52] U.S. Cl. .................................................. 354/189
[58] Field of Search ......................................... 354/189

[56] References Cited

U.S. PATENT DOCUMENTS

| | | |
|---|---|---|
| 346,120 | 7/1886 | McLaughlin . |
| 654,777 | 7/1900 | Benjamin . |
| 752,970 | 2/1904 | Gundermann . |
| 987,232 | 5/1911 | Hutchings . |
| 1,804,061 | 5/1931 | Roth ........................... 354/189 X |
| 2,257,081 | 11/1940 | Whitman . |
| 2,301,921 | 11/1942 | Willcox . |
| 2,619,014 | 11/1952 | Geddes . |
| 3,745,903 | 7/1973 | Studly . |
| 4,497,554 | 2/1985 | Hoffman . |
| 4,602,860 | 7/1986 | Hoffman . |

FOREIGN PATENT DOCUMENTS

| | | | |
|---|---|---|---|
| 13240 | of 1886 | United Kingdom | 354/189 |
| 2042 | of 1887 | United Kingdom | 354/189 |
| 14648 | of 1891 | United Kingdom | 354/189 |

*Primary Examiner*—Michael L. Gellner
*Attorney, Agent, or Firm*—Hale and Dorr

[57] ABSTRACT

In a field type camera, having a flat bed, a front standard and a rear standard, both of which are mounted on frame elements of the bed, and both of which can be moved forward and backward, enabling focusing an image upon a ground-glass focusing screen, a rack and pinion device is provided to the point at which the front or rear standard of the camera is normally hinged to the base for folding up the camera, the hinge arrangement allowing the front and rear standards to be folded to a position which is parallel to the flat bed. A shaft near the base of the standard runs from one side of the camera to the other. On the shaft a pinion is mounted at each end. Each pinion engages a rack mounted at respective ends. When the pinions are turned, they drive the camera standard forward or backward relative to the base, causing the standard to pivot from a location near to, but not limited to, the vertical mid-line of the standard, effecting a mid-line tilt. The shaft and pinion assembly is also integrated with a system of grooved plates which slide upon one another, permitting the rear standard to be translated in a plane which remains coincident with the plane already established. The camera includes a traditional base support strut, which on known folding flat bed cameras constitutes the only means of executing the rear tilt.

10 Claims, 5 Drawing Sheets

MID-LINE TILT MECHANISM FOR VIEW CAMERA

TECHNICAL FIELD

This invention relates generally to the field of photographic cameras and more specifically to view type cameras. The apparatus of the invention provides a combination of several types of tilting motions, primarily for, but not limited to, the rear portion of a view type camera offering various movements of front and rear standards. The invention also relates to substantially vertical translations of the rear standard of a view camera integrated with the above-mentioned tilt movements.

BACKGROUND OF THE INVENTION

View cameras are a type of camera used by the professional photographer or by the serious amateur photographer.

View cameras are characterized by several basic components. A camera bed or base is generally arranged to allow it to be telescoped so that the distance between a lens carrying front standard and a film or ground glass carrying rear standard may be lengthened or shortened.

It will be understood that, while the following discussion refers to a vertical dimension and a horizontal dimension, this reference pertains to the attitude of the camera as normally initially set up on a tripod or other support, with the standards lying in parallel planes, with colinear centers that lie on a line that is perpendicular to the long axis of the tripod. With adjustments to the tripod, the standards may be made to lie in virtually any plane desired, at which point the terms "vertical," "horizontal," "side to side," etc., as applied to the motions of the standards, would be arbitrary. For the purposes of the following discussion, and the claims, unless otherwise stated, the description pertains to a camera in the initial set up position, with the standards lying in parallel planes having colinear centers lying on a line that is perpendicular to the long axis of a tripod, or support, or in other words, horizontal. Also, in the following discussion, it will be assumed that the photographer stands behind the camera, facing the subject.

The front standard of the view camera generally consists of a lens carrying board supported by an upstanding arm support and the entire front standard assembly possesses a number of degrees of freedom so that the lens may be adjusted to a wide variety of positions. Typical adjustments of the lens and lens board include an up and down translation, a lateral translation from side to side, a forward and backward tilting adjustment about a pivot axis passing horizontally from side to side through or below the lens board, and a swing or rotary adjustment about a substantially vertical axis running through the lens board.

A similar supporting frame is provided for the rear standard of the camera and many degrees of adjustment are also possible there. The rear section of the camera carries the ground glass plate used in focusing the camera. The film pack or film plate is also carried by the rear standard of the view camera and, after the camera is properly focused, the film is placed in the position previously occupied by the focusing ground glass.

The front standard of the camera is joined to the back standard of the camera by an expandable bellows. The bellows is generally formed of a rubber or plastic-coated fabric or leather and fabric and must, of course, be completely free of light leaks.

The many degrees of adjustment possible with a view camera are useful in a number of different applications. When photographing a subject having a planar face, if the portion of the camera carrying the film is not parallel with the face of the subject to be photographed, a distorted image of that face will be recorded by the camera. For example, tall buildings will appear to taper and slope backwards. To correct these distortions, the film plate must be parallel to the pertinent lines of the subject.

It will be understood that view cameras are normally used by setting them up, initially, with the base aligned parallel to the line of sight and both standards perpendicular to the line of sight. As used below, "line of sight" shall refer to a line from an arbitrary point on the photographic subject, to the lens, as the camera is initially set up with all tilt, shift and swing adjustments at a nominal home position. As the various tilt, swing and shift adjustments are made, the foregoing perpendicularities cease. As the camera is manipulated, the line from the object to the lens may change; the line of sight remains stationary.

Several of the adjustments obtainable with a view camera are as follows. A "down-angle" adjustment (front standard lower than back standard) or "up-angle" adjustment (front standard higher than back standard) permits special photographic effects. For example, the "up-angle" adjustment is often used in photographing buildings. Horizontal and vertical swings (or pivots) of either standard permit an adjustment of the depth of field to sharpen the image of an object nearer to one side of the lens. The rise and fall of the lens carrying board permits the raising or lowering of the lens without changing the attitude (inclination) of either the front or rear standards. Similarly, the lateral, or side shift of the camera front and back permits shifting the lens without changing the attitude of either the front or rear standards.

The invention deals particularly with a type of view camera known as a "field camera." A field camera includes a front and a rear standard, each supported by a frame, which frames in turn translate forward and rearward and are supported by a flat bed. In most cases a field camera's front and rear standards fold into a compact configuration. Known field cameras that incorporate support arms or struts to achieve and control the forward and rearward tilting movement of the front and/or rear standard, and in some cases to allow the folding of compact cameras, have had the capability only of achieving a tilt around a pivot axis located at the base or bed (referred to below as a "base tilt").

When a standard is tilted relative to the substantially horizontal bed after focusing, the standard, which carries the focal point of the ground glass, is swung away from its initial substantially vertical position, requiring refocusing to a degree roughly equal to the distance described by the arc of the tilted standard. To achieve the advantages set out above, a great deal of iterative tilting and refocusing is necessary in order to arrive at the final correct position of the components of the camera, which requires the photographer to move his hands back and forth from one set of controls to the other until the final, precise adjustment is accomplished. It is desirable to provide a tilt, referred to below as a "mid-line tilt," where the standard carrying the focusing ground glass tilts about an axis passing horizontally through the vertical mid-line of the film plate or ground glass and substantially perpendicular to the line of sight.

Another type of view camera, a monorail camera, includes a pair of standards supported by frames which translate forward and backward along a single monorail tube, which tube lies beneath the camera in the center (from left to right relative to the photographer). In monorail cameras, mid-line tilts, or mid-line tilts combined with base tilts are known. However, never has a flat bed field camera, whether of metal or wood, been capable of both mid-line tilts and base tilts in the rear, nor has any field camera which uses struts to facilitate folding and/or base tilt, ever been capable of mid-line tilts in the rear.

OBJECTS OF THE INVENTION

A principal object of the invention is to provide the means for a mid-line tilt to a folding field type camera, such that either a mid-line tilt or a base tilt may be used without sacrificing the folding feature of the camera.

Another object of the invention is to provide automatic compensation for focusing upon very close objects, while not throwing distant objects out of focus.

Another object of the invention is to provide for simultaneous, independent manipulation of both mid-line tilt and focus, which facilitates rapid and efficient adjustment of the camera.

Another object of the invention is to provide rising or falling nominally vertical movement to the standard, which allows the standard to remain in its established plane, and therefore to retain its focus during adjustment.

Another object of the invention is to integrate the mid-line tilting mechanism with the rising-falling mechanism so that the above conditions are made possible.

Another object of the invention is to allow the ground glass focusing screen, within practical limits, to remain virtually in focus near its center during mid-line tilting, up to a certain normal extent of mid-line tilt.

SUMMARY OF THE INVENTION

The invention features a rack and pinion, placed at the base of the camera standard, which, when operated, will cause the base of the camera standard to move forward or backward in a plane parallel to the bed of the camera along the line of sight, thereby causing the standard to tilt about an axis, where the standard is secured by the support arm close to the mid-line of the vertical extent of the ground glass or film plane. The invention provides the option of utilizing either the rack and pinion enabled mid-line tilt or the base tilt enabled by the strut or a combination of the two. Further, the shaft upon which the pinions are mounted may perform the duty of the folding hinge as well as the journal for the rack and pinion mechanism. The invention may be combined with a set of grooved plates for the purpose of providing a vertical movement for the standard.

The invention provides automatic compensation for cases when it is necessary to focus upon both very near and very distant objects in the same photograph by moving the top of the ground glass through a progressively greater arc than the bottom, after a certain normal degree of tilt has been exceeded.

BRIEF DESCRIPTION OF THE FIGURES OF THE DRAWING

In FIG. 3, the standard is shown in an arbitrary tilted position. Also in FIG. 3, the vertical movement is shown at its uppermost position.

DETAILED DISCUSSION OF A PREFERRED EMBODIMENT OF THE INVENTION

Figure 1:
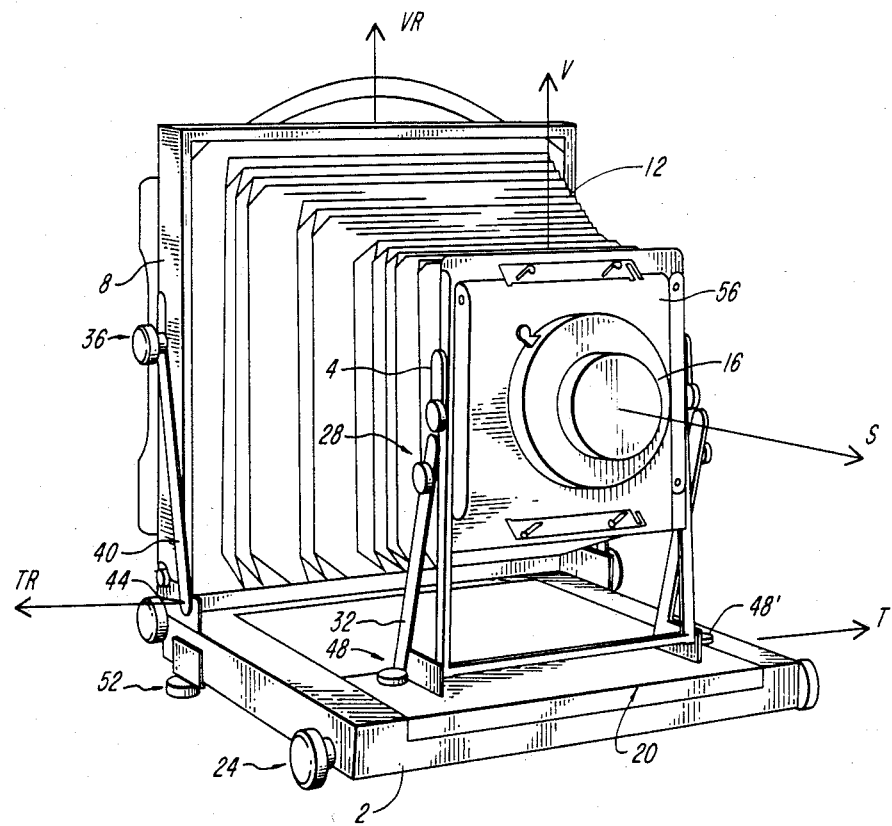
FIG. 1 is a perspective view of a field camera of the prior art in a normal, set up position with front and rear standards in a vertical, untilted position with no swing imposed.

A schematic view of a view camera of the prior art is shown in FIG. 1. A bed 2 supports a front standard 4 and a rear standard 8, which are connected by bellows 12. Light from the subject (not shown) enters the camera through lens 16 and strikes film carried by the rear standard 8. The line of sight is indicated by arrow S.

The rear standard 8 also carries a ground glass plate (not shown) used for focusing. As has been mentioned above, the ground glass plate is displaced or removed after focusing and a film plate is inserted in its place. The front standard 4 is carried on focusing track 20, which may be displaced varying distances from the rear standard 8 by rotating the focusing knob 24. There may also be focusing mechanisms for independently moving the rear standard toward the front standard, and vice versa, although an embodiment including such a mechanism is not illustrated in FIG. 1. The front standard 4 may be tilted about a horizontal axis, indicated by arrow T, perpendicular to the line of sight, by loosening front tilt control nut 28 and tilting the front standard 4. In that case, the lower portion of the strut 32 which supports the standard 4 remains fixed and the shaft supporting the front tilt control nut 28 slides along the length of the strut 32 in a slot (not shown).

The rear standard 8 may also be tilted by adjusting rear tilt control nut 36, which permits the rear standard to be tilted about an axis TR while anchoring rear strut 40 to the bed at axle 44. The front standard 4 may be swung about a vertical axis, indicated by arrow V, by loosening front swing control 48 and its analog 48'. A swing is defined as when one vertical side of the front standard 4 moves toward the rear standard 8 and one vertical side of the standard 4 moves away from the rear standard 8. Similarly, the rear standard 8 may be swung about an axis indicated by arrow VR with respect to the front standard 4 by adjusting rear swing control 52 and its analog on the opposite side (not shown). Lens board 56, which carries the lens 16, may be rather easily removed to facilitate changing of the lens.

Figure 2:
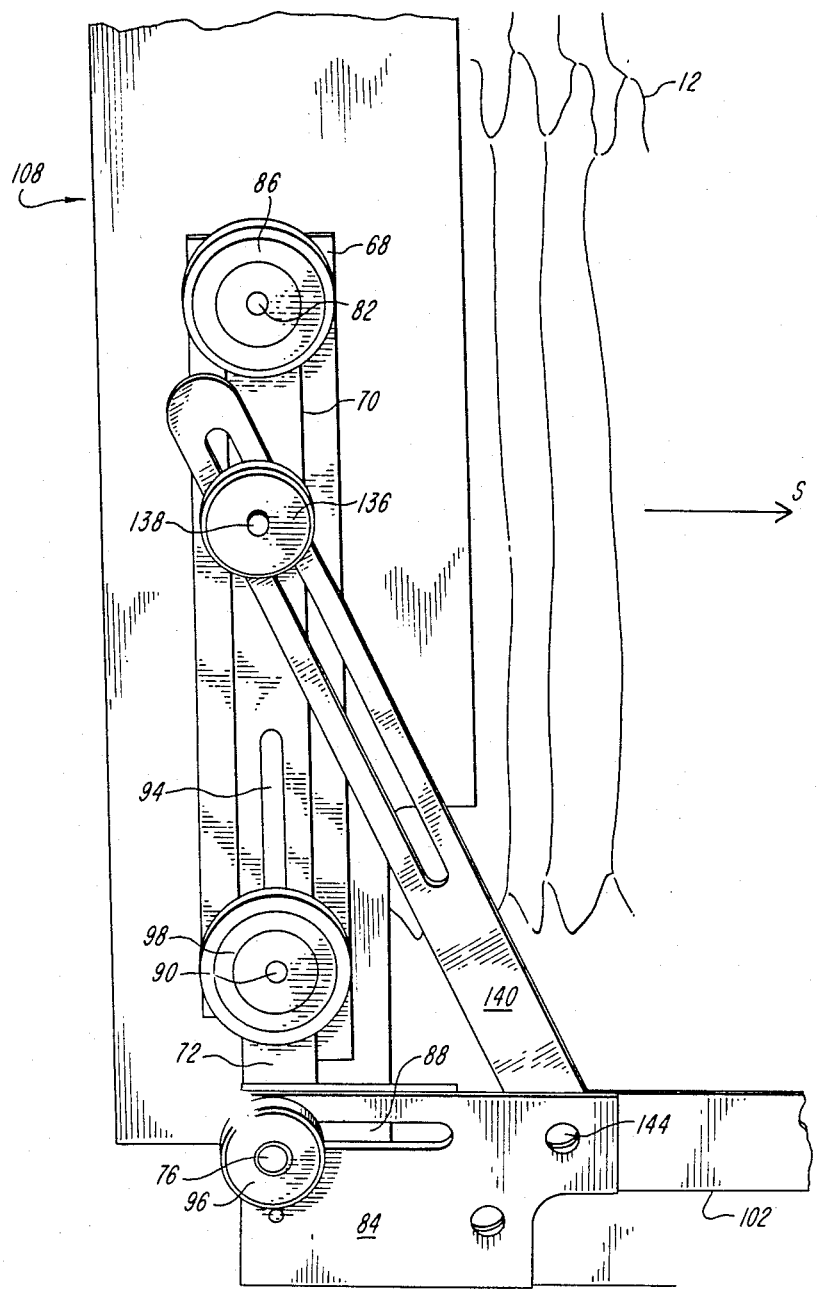
FIG. 2 is a side elevation showing, schematically, the rear standard of a field type view camera. The standard is in an upright, substantially vertical, untilted position, and no vertical movement has been imposed.

Referring to FIG. 2, the rear standard 108 of an embodiment of the invention has secured to it a plate 68 having a pair of longitudinal grooves 70 spaced inwardly from the longitudinal edges of plate 68. Plate 68 may advantageously be made of metal. Sliding plate 72 rides in the grooves. At the lowest end of sliding plate 72, rotatable shaft 76 passes through a hole (not shown). Secured to shaft 76, and adjacent plate 72 so as to be in contact with it, is pinion 80 (shown best with reference to FIG. 3). Also adjacent pinion 80 on the face of the pinion opposite plate 72 is standard base plate 84. Standard base plate 84 has a slot 88 which is parallel to the line of sight S and through which shaft 76 extends. Slot 88 is very close in width to the diameter of shaft 76 so as to admit the movement of shaft 76 in slot 88 without a perceptible amount of vertical play. Standard base plate 84 is connected through means not shown to bed 102, such that standard 108 may translate and rotate with respect to bed 102. The connection means may include rack and pinion tracks, swivels, and other linkage means known to one of skill in the art.

Upon the inside surface of plate 84 (seen best in FIG. 4), and situated parallel to slot 88 in such a manner as to allow proper engagement with pinion 80, is gear rack 92. The pitch lines of gear rack 92 and pinion 80 are located so that their respective teeth have no play or backlash between them. It should be noted that in the drawing, the rack 92 is located above the shaft 76 and pinion 80; however, the invention would work equally well with the rack 92 located below the shaft 76 and pinion 80.

Figure 3:
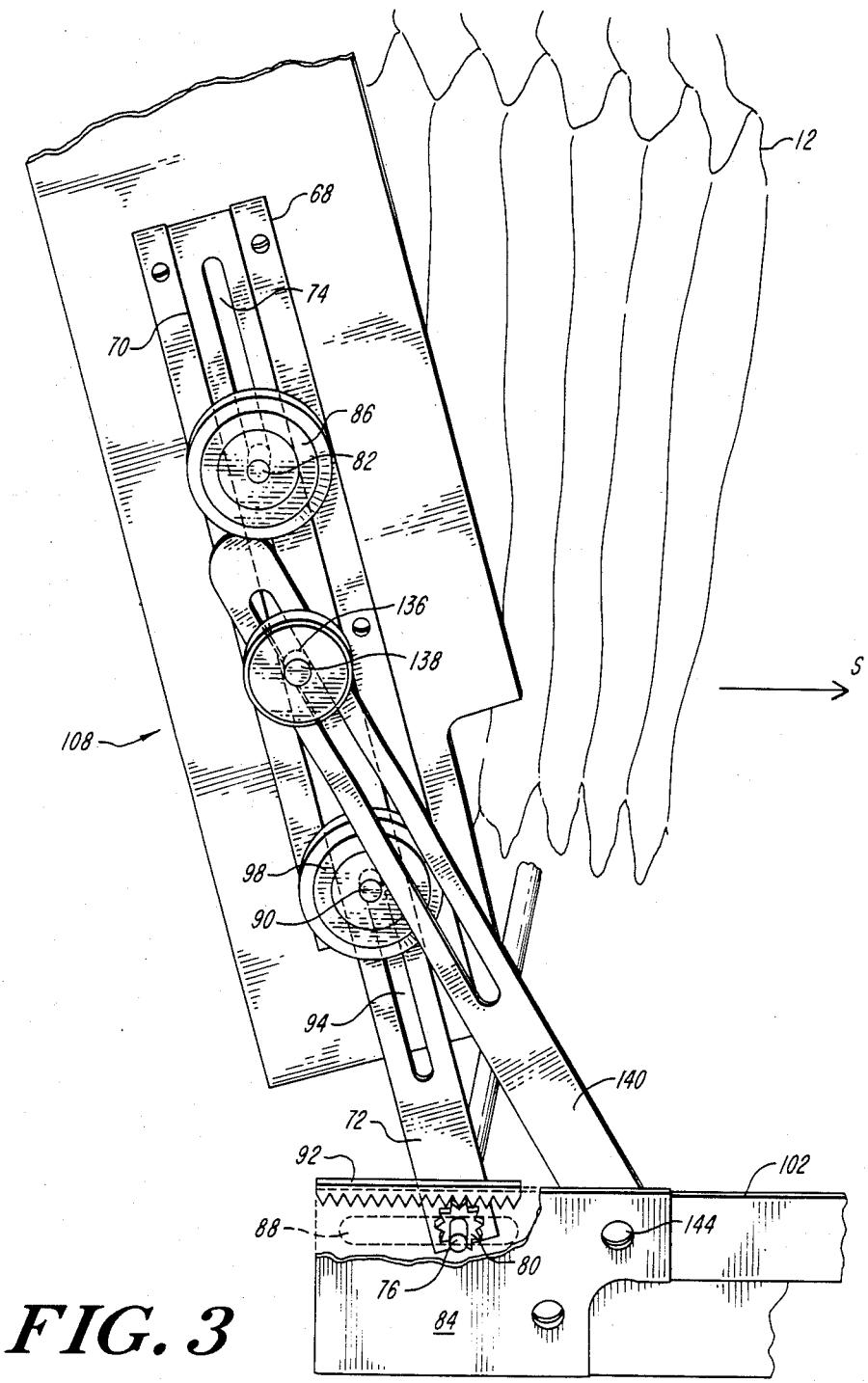
FIG. 3 is a side elevation showing, schematically, the same view of FIG. 1, showing in phantom the rack and pinion at the base of the standard, and portions of the sliding plates which comprise the rise mechanism.

The shaft 76, which has mounted on it knob 96, is rotated, which in turn rotates pinion 80, driving the entire standard assembly 108 forward or backward along an axis parallel to the line of sight S as the pinion 80 engages rack 92 and shaft 76 slides in slot 88. On the left side of the camera (seen best in FIG. 4), shaft 76 is threaded on its end and a knob 97, instead of being fixed with respect to rotation relative to the shaft, as is knob 96, has instead an internal thread which matches a thread on the end of shaft 76. This knob 97 is thus capable of locking down against the left hand plate 84', thereby preventing shaft 76 from rotating. Thus, once the locking knob 97 is locked down, there can be no rotation of knob 96 and thus no translation of pinion 80. Thus the entire assembly can be fixed at any desired position, for instance, as shown in FIG. 3.

As shaft 76 is moved forward or backward by its rotation and engagement with rack 92, it moves plate 72, plate 68 and standard 108 horizontally backward and forward at their base. Strut 140 is hinged to plate 84 by screw 144. At its upper end strut 140 is secured to plate 72 by threaded knob 136 and threaded shaft 138. Threaded shaft 138 is approximately at the vertical mid-line of ground glass (or film pack) 107. Knob 136 secures strut 140 to plate 72, as in a scissors, with the hinge at shaft 138. Knob 136 may be tightened so that no translation is permitted between strut 140 and plate 72. The strut 140 is thus of fixed length and limits the movement of the vertically central part of standard 108 to a very small arc of a fixed radius. Thus, the vertically central part of the standard 108 remains virtually vertically stationary as the shaft 76 and all the lower mechanisms of the standard 108 move forward and backward at its base. The resulting compound movement effects a tilt of the entire rear standard 108 with its axis (indicated by arrow TR' in FIG. 4) near the vertical mid-line of the ground glass or film pack 107 and the axis of knob 136.

It is also possible to loosen knob 136 so as to allow translation between strut 140 and plate 72. Such translation permits a compound base tilt, about a base axis running through bolt 144 and moving mid-line axis at shaft 138.

Figure 4:
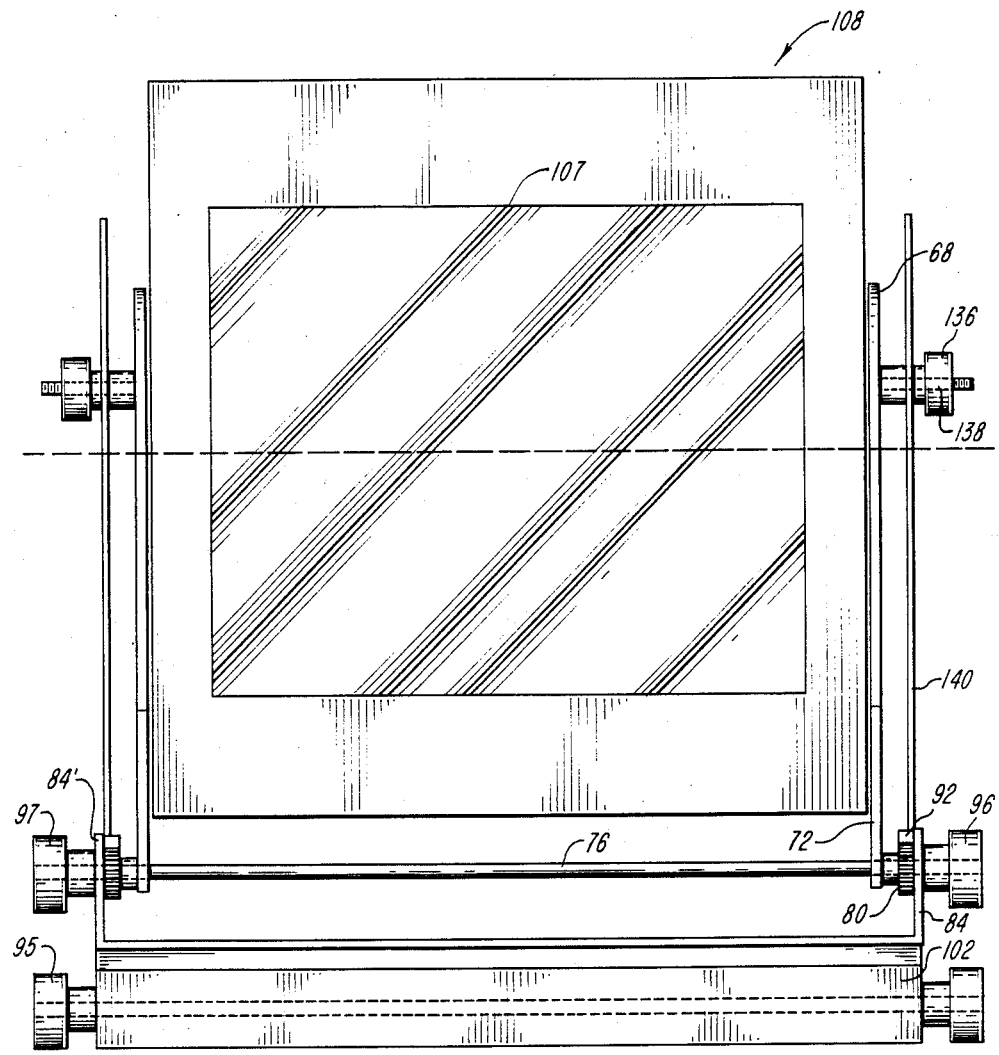
FIG. 4 is a rear elevation showing schematically a rear standard of the invention, with some parts removed.

In the embodiment pictured, the axis of the mid-line tilting action described above lies approximately at the center of the vertical extent of the camera's ground glass 107 (shown in FIG. 4). This axis remains substantially vertically stationary, within practical limits, through approximately the first fifteen degrees of mid-line tilt as measured counter-clockwise (backward) from a starting orientation shown in FIG. 2. Beyond the first fifteen degrees of backward mid-line tilt, the threaded shaft 138 describes a progressively greater arc, and by its action both causes the axis of mid-line tilt to become progressively lower and causes the upper portion of standard 108 (from shaft 138 toward slot 74) to describe an arc of a progressively greater length, as measured about the axis at 138, than described by the lower portion of standard 108 (from shaft 138 toward slot 94). As will be understood by those of skill in the art, the progressively greater arc traced by the upper portion as compared to the lower portion, automatically provides for focusing a field including both distant objects and very near objects because such focusing requires precisely this arrangement in tilt of the rear standard.

The construction and function of the vertical adjustment mechanism is as follows. The metal plate 68 has a groove 70 in which plate 72 slides. Plate 68 also has slot 74, in which a T-screw rides. The T-screw 82 extends from the back of plate 68, through a hole in plate 72, and has knob 86 threaded on to it. In a similar manner, screw 90 is threaded through a tapped hole in plate 68, and extends through slot 94 in plate 72 and has knob 98 threaded onto it. By loosening the knobs 98 and 86 the plate 72 is allowed to slide in plate 68, its full extent of travel limited by the length of slots 74 and 94, and by the screws 90 and 82 riding in their respective slots. By this action standard 108 is able to rise in a plane parallel with the ground glass 107, no matter what the inclination of the tilt mechanism. This facilitates maintaining a focus already achieved, while changing the elevation of rear standard 108.

The mechanism also permits simultaneous, independent, two-handed focusing and tilt adjustment. Once the image has been focused on the screen, tilt adjustments invariably require additional focusing adjustments. Providing a focusing control knob 95 (shown in FIG. 4) on the side of the camera opposite the tilt control knob 96 permits the photographer to simultaneously tilt and focus, using one hand for each, thus avoiding the cumbersome iterative tilt and focus.

It should be understood that the foregoing discussion is meant to be illustrative and not limiting in any sense. Particularly, the rack and pinion axis tilt mechanism may be applied not only to the rear standard but also to the forward standard in precisely the same manner, as shown in FIG. 5.

Standard 208 is supported by plate 268 and by strut 240. Plate 268 is secured by means of shaft 276 to standard base plate 284, which in turn is secured by means not shown to bed 102. Strut 240 is secured through pin 244 to standard base plate 284 so that strut 240 may swing with respect to plate 284 but may not translate with respect to it. Pinion 280 is journaled on shaft 276 adjacent plate 268. Fixed to standard base plate 284, also adjacent pinion 280 is rack 292, such that the gear teeth of rack 292 and pinion 280 mesh. Strut 240 secures standard 208 by means of knob 236 threaded onto shaft 238.

Figure 5:
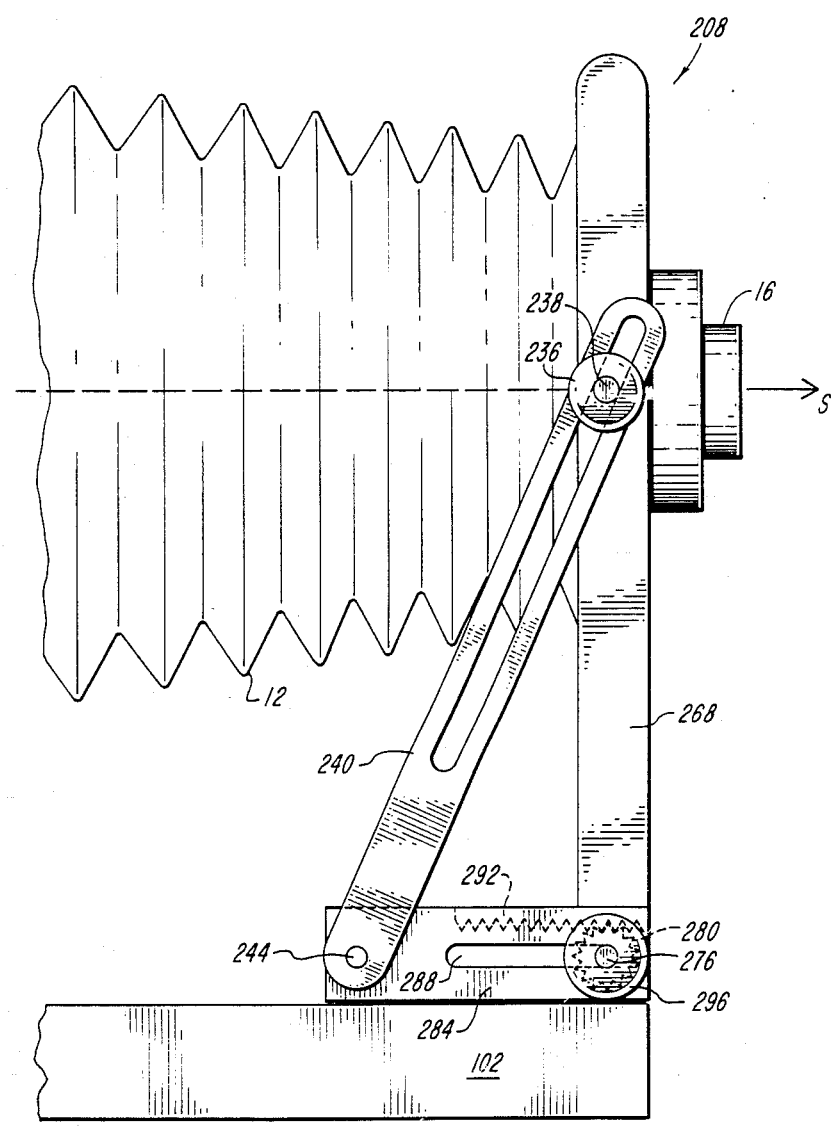
FIG. 5 shows schematically a side elevation of the front standard of a field camera incorporating the invention.

As an example of a midline axis tilt, in order to tilt the upper portion of front standard 208 forward, knob 236 is loosened and knob 296 is rotated counterclockwise, thereby driving the bottom portions of plate 268 and thus standard 208 rearward (to the left as shown in FIG. 5) and consequently bringing the upper portion of standard 208 forward. As was the case with the rear standard 108, through small midline axis tilts of approximately 15° or less, the axis of the midline tilt remains approximately stationary, coincident with shaft 238.

Further, as has been mentioned above, the rack may be located either above the pinion or below the pinion in either case. The rack and pinion may be replaced by a wheel and friction surface, pressed against each other with a sufficient normal force to carry the standard upon turning of the knob 96. Finally, the camera may be set up on a tripod or other support so that the bed is in positions other than horizontal and the standards are in positions other than vertical.

Having thus described the invention, what is claimed is:

1. A view type camera having an elongate, planar bed carrying a standard base, a front standard for carrying a lens board and a rear standard for carrying a planar focusing screen and means for carrying film, the rear standard being movable from a first position where the focusing screen is nominally perpendicular to the line of sight and the plane of the bed to a second inclined position, the camera comprising:
   (a) at least one base support strut hinged to the standard base and releasably slidably hinged to the rear standard; and
   (b) at least one additional support member, designated as a "mid-line" support member, releasably slidably hinged to the base support strut and fixed to the rear standard and releasably hinged to the standard base and translatable with respect to the bed and with respect to the at least one base support strut's end that is hinged to the standard base; and
   (c) means for translating the mid-line support member's end that is releasably hinged to the standard base, parallel the long axis of the bed.

2. The camera of claim 1 further comprising a pair of base struts, each base strut having an elongated slot and means, passing through the slot, for slideably fixing the base strut to the rear standard.

3. The camera of claim 2 further comprising a pair of mid-line members.

4. The camera of claim 3, the hinge connecting the mid-line members to the standard base further comprising a shaft connected to each of the pair of mid-line struts.

5. The camera of claim 4 further comprising a means for locking the shaft and mid-line members in a desired position.

6. The camera of claim 5 further comprising:
   (a) a wheel attached to one end of the shaft adjacent the bed; and
   (b) frictionally contacting the wheel, a track attached to the bed parallel the path through which the end of the mid-line member translates.

7. The camera of claim 6 further where the wheel comprises a pinion and the track comprises a rack.

8. The camera of claim 7 further where each mid-line member slides longitudinally along an elongate plate attached on a lateral side of the standard parallel the extension of the focusing screen that is initially perpendicular to the plane of the bed, whereby the standard may be translated parallel the extension of the focusing screen that is initially perpendicular to the plane of the bed.

9. The camera of claim 7, further comprising:
   (a) means for focusing by translating the standard base parallel the long extension of the bed;
   (b) means for actuating the means for focusing; and
   (c) means for actuating the means for translating the end of the mid-line support member, located on the opposite side of the camera from the means for actuating the means for focusing.

10. A view type camera having an elongate, planar bed carrying at least one standard base, a front standard for carrying a lens board and a rear standard for carrying a planar focusing screen and means for carrying film, at least one standard being movable from a first position to a second inclined position, comprising:
   (a) at least one base support strut hinged to a standard base, and releasably slideably hinged to the at least one standard;
   (b) at least one additional support member, designated as a "mid-line" support member, releasably slidably hinged to the base support strut and fixed to the at least one standard and releasably hinged to the standard base, translatable with respect to the bed and with respect to the at least one base support member's end that is hinged to the standard base; and
   (c) means for translating the mid-line support member's end that is releasably hinged to the standard base, parallel the long axis of the bed.

* * * * *